United States Patent [19]

Toaz

[11] 3,812,563

[45] May 28, 1974

[54] METHOD OF FORMING A COMPOSITE BEARING STRUCTURE

[75] Inventor: Milton W. Toaz, Bedford, Ohio
[73] Assignee: Gould Inc., Chicago, Ill.
[22] Filed: Nov. 29, 1972
[21] Appl. No.: 310,356

[52] U.S. Cl. .................................. 29/149.5 PM
[51] Int. Cl. ...................... B23p 11/00, B21d 53/10
[58] Field of Search...... 29/149.5 PM, 196.2, 420.5; 308/237

[56] References Cited
UNITED STATES PATENTS
3,104,135   9/1963   Morrison et al. .................. 308/237
3,445,909   5/1969   Beebe, Jr. .................. 29/149.5 PM

*Primary Examiner*—Thomas H. Eager
*Attorney, Agent, or Firm*—Edward E. Sachs

[57] ABSTRACT

A method of forming a composite bearing structure including a metallic substrate having a bearing material adherently bonded thereto is provided which comprises the steps of treating the surface of a metallic substrate to remove undesirable substances therefrom, applying a layer of metallic bonding material to at least a part of the treated surface of the substrate, covering at least a part of the bonding material with a layer of bearing material, heating the so-formed article to a temperature sufficient to activate both the bonding material and the bearing material, and densifying both the bearing material and the bonding material while causing the metallic substrate to be reduced in thickness to thereby cause the bearing material to become bonded to the bonding layer which, in turn, is bonded to the metallic substrate.

19 Claims, No Drawings

METHOD OF FORMING A COMPOSITE BEARING STRUCTURE

BACKGROUND OF THE INVENTION

One technique which is commonly used to form composite bearing materials is to cast the bearing layer or material directly onto the surface of the supporting steel substrate. Another technique which is used extensively to form such an article is to first powder roll particulate bearing material into sheet form, then sinter the so-formed sheet and subsequently affix the sintered sheet of bearing material to the substrate proper by conventional cladding methods.

While these techniques result in usable composite bearing materials, they each suffer from certain inherent disadvantages. For example, the casting technique requires special expensive melting and casting equipment, while the cladding method requires expensive and complex hopper feed devices, rolling mills and sintering apparatus. In addition, these processes are also hampered by the fact they employ a heating step or treatment which often adversely affects the metallurgical properties of the bearing material and/or the substrate on which it is deposited.

The instant invention overcomes certain of these limitations by providing a simplified means of bonding a bearing material to a metallic substrate without adversely affecting the metallurgical properties of the bearing material or the metallic substrate.

SUMMARY OF THE INVENTION

Very briefly, the present invention relates to a method of adherently bonding a bearing material to a metallic substrate without adversely affecting the metallurgical properties of the bearing material or the substrate proper. More specifically, it concerns a method of adherently bonding a bearing material to a metallic substrate which comprises the steps of treating the surface of the metallic substrate primarily to remove any undesirable foreign substances therefrom, depositing a layer of metallic bonding material on at least a portion of the surface of the treated substrate, covering at least a portion of the deposited bonding material with a layer of bearing material, heating the so-coated substrate to a temperature which is sufficient to activate both the bonding and bearing materials, and concurrently densifying the bonding and bearing materials to near theoretical density while reducing the thickness of the substrate to thereby cause the bearing material to become adherently bonded to the metallic substrate.

DESCRIPTION OF THE PREFERRED EMBODIMENTS OF THE INVENTION

In the practice of the invention, it is contemplated that the substrate be fabricated from a metallic material, with the preferred material being steel having a Rockwell hardness ranging from about 40 to about 70 $R_b$. Specifically, a sheet of low carbon steel (AISI C1008) containing, on a weight percentage basis, up to about 0.10 carbon, from about 0.25 to about 0.50 manganese, up to about 0.04 phosphorus and up to about 0.05 sulfur has been used and been found to be highly satisfactory. However, it should be pointed out here that other types of steel may also be used in the practice of the instant invention, with the preferred type of steel being a low carbon steel such as AISI C1009, C1010 or the like.

Once a suitable steel substrate is selected, it is then treated to remove any undesirable foreign surface ingredients therefrom. This treatment usually includes a degreasing operation, to remove any surface oils and/or greases, and a surface sanding or roughening procedure, to basically remove any surface oxide layer which may be present.

To this so-treated substrate a layer of bonding material is then applied. The specific bonding material employed depends to a great extent on the particular bearing material which is to be utilized. For example, if the bearing material to be utilized in a copper base alloy, then it is preferred to use copper or a copper alloy as the bonding material. Likewise, if the bearing material is to be an aluminum base alloy, then it is preferred to use aluminum or an aluminum alloy as the bonding material.

In practice it has been determined that the bonding material should preferably be in the form of a moderately fine powder. The exact particle size is not known, however, extremely good results have been obtained by using particles sized such that they substantially all pass through a 60 U.S. mesh screen.

The bonding material can be applied to the substrate by various techniques. One technique which has been used with highly satisfactory results is to employ a trough type applicator to meter the bonding material onto the surface of the substrate. The speed of applying the bonding material is not critical, as all that is required is that a layer of bonding material of the desired thickness and uniformity be obtained. In practice, it has been found that it is preferred to use a layer of coating material ranging from about 0.020 inch to about 0.040 inch thick.

A layer of bearing material is then deposited over the bonding material in such a manner that the continuity of the bonding layer is not interrupted.

As was the case with the bonding material, the exact method of depositing the bearing material is not critical, so long as a layer of bearing material of the desired thickness and uniformity is obtained. From tests data to date, it has been observed that good results are realized when the thickness of the layer of bearing material ranges from about 0.10 to about 0.020 inch.

The substrate having the bonding and bearing materials positioned thereon is then subjected to a thermal treatment which causes both the bonding and bearing materials to become activated. That is, the bonding and bearing materials are heated to a temperature which improves particle ductility and is sufficient to cause oxide film which may be present on the particles thereof to be broken up by subsequent mechanical working procedures.

The specific temperature required for activation depends, in the main, on the chemical composition of the bonding and bearing materials. For example, when an aluminum base alloy is utilized as the bearing material and the bonding material is aluminum or an aluminum base alloy it is usual to accomplish activation by heating to a temperature ranging from about 450°F to about 950°F, with a temperature of about 950°F being preferred. Whereas, when a copper base alloy is employed as the bearing material and copper or a copper base alloy is utilized as the bonding material it is usual to accomplish activation by heating to a temperature ranging from about 600°F to about 1,000°F, with a temperature of about 850°F being preferred. The exact activation temperature depends on, basically, the chemical and physical properties of the specific bearing and bonding materials utilized and the requirements of the finished stock. For example, it is often desired to activate the bonding and bearing materials at a temperature which is high enough to cause activation and at the same time heat treat the metallic substrate.

It should be noted here that activation is preferably accomplished by heating in an inert atmosphere. In one embodiment of the invention, activation is accomplished by heating the substrate having the bonding and bearing materials thereon in a furnace which utilizes a flowing nitrogen atmosphere to insure that these materials are not oxidized. In this instance, a furnace was used which was contoured at one end to closely fit the rolls of a rolling mill. The so-covered substrate was held in the furnace for a sufficient period of time to insure that temperature equilibrium was achieved.

Thereafter, the substrate having the bonding and bearing materials deposited thereon was moved directly from the furnace into a conventional two-high upright rolling mill.

In the rolling mill, densification of both the bonding and the bearing layers was achieved in such a manner that both layers of material exhibited an apparent density which was essentially equal to the typical wrought density of the respective material. In addition, the steel substrate was reduced, in thickness, about 30 percent. During the co-reduction procedure, the motion of the metal powder particles against themselves and against the contiguous material causes an adherent bond to be formed between the bearing material and the bonding material and, in turn, between the bonding material and the substrate proper. The resultant composite bearing structure comprises a continuous steel substrate having an adherent layer of bonding material affixed thereto with a continuous layer of bearing material being bonded to the surface of the bonding layer. It is to be noted here that this type of adherent bonding does not occur when the bonding and bearing materials are not activated as herein described.

If desired, the resultant composite bearing structure can be sintered. This can be done by using conventional equipment. The exact temperature employed for this procedure depends on the chemical and physical properties of the various components of the resultant composite bearing structure.

A composite bearing structure produced according to the teaching of the subject invention can then be readily fashioned into the desired bearing configuration by conventional methods which are well known to those in the art and, accordingly, will not be discussed herein.

The subject invention can be better understood by reference to the following examples which are set forth herein for illustrative purposes only and are not intended to limit the scope of the subject invention.

EXAMPLE 1

A composite bearing structure was produced as follows:

A strip of low carbon steel (AISI grade C1008) about 18 inches in length by about 5 inches wide by 0.065 inch thick was obtained. The strip of steel had a Rockwell hardness of about $R_b$ 52. The strip of steel contained in weight percent, about 0.010 percent carbon, from about 0.25 to about 0.50 percent manganese, up to about 0.04 percent phosphorus, up to about 0.05 percent sulfur, with the remainder being iron plus incidental impurities.

The strip of steel was then degreased by positioning it in a vapor degreaser which used trichloroethylene as the degreasing media. Next, the surface of the strip of steel was subjected to a sanding procedure to remove any surface oxide layer which might be present. A drum type sander was employed for this purpose. During this procedure, a finish of about 200 microinches was obtained.

Taking care to avoid contamination of the treated surface of the strip of steel, it was placed upon a flat surface with the treated surface up. Then, using a trough type applicator device which deposits material across the width of the strip, a bonding layer of through 60 U.S. mesh aluminum powder was deposited uniformly on the strip. To insure the uniformity of the bonding layer, the trough type applicator was provided with an adjustable doctor blade. The so-applied layer of bonding material had a thickness of about 0.025 inch.

A uniform layer of alloyed bearing powder size such that substantially all of it passes through a 40 U.S. mesh screen was deposited on top of the bonding layer by the same technique and apparatus utilized to deposit the bonding material on the substrate. The prealloyed bearing alloy consisted of, in weight percent, about 8 percent lead, about 4 percent silicon and about 0.5 percent copper with the remainder (about 87.5 percent) being aluminum plus incidental impurities. The thickness of the bearing material was about 0.100 inch. The continuity of the bonding layer was not disturbed by the deposition of the bearing alloy.

The strip of steel having the bonding and bearing materials positioned thereon was then placed into a furnace and heated at about 950°F for about 10 minutes in an inert (nitrogen) atmosphere to activate the bonding and bearing materials.

The strip of steel having the activated materials thereon was then inserted into a conventional two-high upright rolling mill and the powder metal layers thereon were co-reduced. After this reduction treatment, respective layers of bonding and bearing materials each exhibited an apparent density which was essentially equal to the typical wrought density of the concerned material. In addition, the supporting strip of steel or metallic substrate was reduced in thickness about 30 percent, that is, to a thickness of about 0.046 inch.

The resultant composite bearing structure was examined metallurgically and found to consist of a steel substrate, a continuous layer of aluminum adherently bonded to the one surface of the substrate and, in turn, a continuous layer of a predominantly aluminum-lead-silicon bearing alloy adherently bonded to the surface of the aluminum bonding layer.

This composite bearing material was then readily formed into individual bearings by conventional techniques. Subsequently, the so-produced bearings were tested and found to function in the normal manner.

EXAMPLE 2

A composite bearing structure was produced as follows:

A strip of steel of the type described in Example 1 was obtained. The surface of this strip of steel was then treated as described in Example 1. A bonding layer of comminuted copper particles sized such that substantially all pass through a 100 U.S. mesh screen was applied to the treated surface of the strip of steel by the technique described in Example 1. The so-applied bonding layer had a thickness of about 0.025 inch. The layer of bonding material was then covered with a layer of bearing material by the same technique described in Example 1 which consisted of, in weight percent, about 75 percent copper, about 25 percent lead and about 0.25 percent tin, plus incidental impurities. The thickness of this layer was about 0.100 inch.

The strip of steel having bonding and bearing materials positioned thereon was then placed into a furnace and heated at about 850°F for about 10 minutes in an inert atmosphere to activate the bonding and bearing materials.

The strip of steel having the activated materials thereon was then inserted into a rolling mill and rolled as described in Example 1 to concurrently co-reduce the bonding and bearing materials and reduce the substrate about 25 percent in thickness.

The resultant composite bearing structure was examined metallurgically and found to consist of a steel substrate, a layer of copper adherently bonded to the one surface of the substrate and, in turn, a layer of a predominantly copper-lead bearing alloy adherently bonded to the surface of the copper bonding layer.

This composite bearing material was then readily formed into individual bearings by conventional techniques. Subsequently the so-produced bearings were tested and found to function in the normal manner.

The process of the subject invention has the advantage that it can be performed on a standard rolling mill with very little additional equipment being required. Also, any additional equipment that which may be required is of simple construction. The subject process minimizes the number of steps necessary to produce steel backed bearing strip and is therefore a more efficient and economical process.

While the subject invention has been described with reference to the production of a composite bearing structure in the form of a relatively short strip of material, it is obvious to those skilled in the art that it can be utilized to produce a composite bearing material in other forms. For example, it can be utilized to produce a coil of composite bearing material.

In such a system, steel in coil form is run through a line and attached to a recoiler. The line consists of a caustic washer, sanding machine, powder applicator stations, induction heating unit, and the rolling mill. Suitable gaging equipment and liner measuring devices should be included. The steel strip is cleaned of grease etc. by the caustic washer, then surface sanded to remove scale, oxide, etc. and impart a surface finish of about 200 microinches. The powder feeder then applies a uniform initial powder layer of a pure material or an alloy which acts as a bonding layer. This is followed by a second powder application of prealloyed powder of the bearing alloy over the bonding layer. The strip passes through an induction coil or resistance furnace where it is heated to the required temperature, held for the optimum time and then passed to the rolling mill where co-reduction of the steel and powders occur. The powders are compacted to nearly wrought density and the steel is reduced about 30 percent. The resultant composite strip may be slit on the line or at a later time as desired and coiled for storage. The strip may be sintered or used as-clad for the preparation of bearings.

While there have been described herein what at present are considered to be the preferred embodiments of the instant invention, it will be readily appreciated by those skilled in the art that various changes and modifications may be made in the materials and the practice of the instant invention without departing from its spirit and scope.

For example, the bearing structure of the invention can be formed by starting with a low carbon steel substrate which has been pre-coated with a thin bonding layer of wrought aluminum, covering at least a part of the coating of aluminum with a layer of bearing material, heating the substrate to a temperature sufficient to activate the bearing material, and densifying the bearing layer to near wrought density while causing the metallic substrate to be reduced in thickness to thereby cause the bearing material to become adherently bonded to the substrate by means of the bonding layer.

It should be noted that materials other than aluminum-lead and copper-lead base alloys can be used as bearing materials. For example, alloys of aluminum or copper with other metals such as tin, cadmium or other well known bearing materials can be employed in the practice of the invention.

Likewise, it should be noted that while it is preferred to employ either copper or aluminum, as appropriate, as the bonding layer, alloys of these metals may also be utilized in the practice of the invention. For example, an alloy of aluminum and silicon has been used with good success. In this embodiment of the invention, the activation temperature ranges from about 650° to about 900°F.

As used herein the term "base alloy" means that the concerned alloy exhibits the physical and chemical properties of its recited components.

What is claimed is:

1. A method of adherently bonding a layer of bearing material to a metallic substrate comprising:
  a. treating the surface of the metallic substrate to which the adherent layer of bearing material is to be applied to remove undesirable substances therefrom;
  b. applying a layer of powdered metallic bonding material to at least a part of the treated surface of the substrate;
  c. covering at least a part of the layer of bonding material with a layer of powdered bearing material;
  d. heating the substrate having the bearing and bonding materials thereon to a predetermined temperature sufficient to activate both the bonding material and the bearing material by softening said materials and thereby increasing the ductility of said materials, whereby oxide film on said activated materials is broken up by subsequent mechanical working.
  e. immediately thereafter densifying the bonding material and bearing material concurrently to near wrought density while causing the metallic substrate to be reduced in thickness to thereby cause the bearing material to become adherently bonded to the substrate by means of the bonding layer.

2. The method of claim 1 wherein said metallic substrate is fabricated from steel.

3. The method of claim 1 wherein said metallic substrate is a low carbon steel which consists essentially of, in weight percent, up to 0.10 percent carbon with the remainder being iron plus incidental impurities.

4. The method of claim 1 wherein the metallic substrate has an average thickness of about 0.065 inch before being reduced in thickness.

5. The method of claim 1 wherein said treating of the surface of said metallic substrate includes the removal of surface grease found thereon.

6. The method of claim 5 wherein trichloroethylene is utilized to remove said surface grease.

7. The method of claim 1 wherein said treating of the surface of said metallic substrate includes the removal of surface oxide film found thereon.

8. The method of claim 1 wherein said surface oxide film is removed by sanding.

9. The method of claim 1 wherein the surface of said metallic substrate is roughened before said bonding material is deposited thereon.

10. The method of claim 1 wherein said treating of the surface of said metallic substrate is accomplished by first treating said surface to remove grease therefrom and then treating it to remove oxide film therefrom.

11. The method of claim 1 wherein the bonding material is selected from the group of metals consisting of aluminum, copper and alloys thereof.

12. The method of claim 11 wherein said bonding material is sized such that substantially all of it passes through a 60 U.S. mesh screen.

13. The method of claim 1 wherein said bearing material is an alloy selected from the group consisting of aluminum-lead base alloys and copper-lead base alloys.

14. The method of claim 1 wherein:
a. the bonding material is a metal selected from the group consisting of aluminum and aluminum base alloys;
b. the bearing material is an aluminum-lead base alloy; and
c. the activation temperature ranges from about 650°F to about 950°F.

15. The method of claim 1 wherein:
a. the bonding material is a metal selected from the group consisting of copper and copper base alloys;
b. the bearing material is a copper-lead base alloy; and
c. the activation temperature ranges from about 600°F to about 1,000°F.

16. The method of claim 1 wherein said substrate is reduced approximately up to about 30 percent in thickness.

17. The method of claim 1 wherein:
a. the bonding material is a metal selected from the group consisting of aluminum and aluminum base alloys;
b. the bearing material is an aluminum-tin base alloy; and
c. the activation temperature ranges from about 450°F to about 950°F.

18. The method of claim 1 wherein:
a. the bonding material is an aluminum-silicon base alloy;
b. the bearing material is an aluminum-lead base alloy; and
c. the activation temperature ranges from about 650°F to about 900°F.

19. A method of applying an adherent layer of bearing material to a metallic substrate having a surface coating of wrought aluminum thereon comprising:
a. treating the surface of the metallic substrate to which the adherent layer of bearing material is to be applied to remove undesirable substances therefrom;
b. covering at least a part of the aluminum coated surface of the substrate with a layer of powdered bearing material;
c. heating the substrate having the bearing material thereon to a predetermined temperature sufficient to activate the bearing material by softening said bearing material and thereby increasing the ductility of said material whereby oxide film on said activated material is broken up by subsequent mechanical working; and
d. immediately thereafter densifying the bearing material to near wrought density while causing the metallic substrate to be reduced in thickness to thereby cause the bearing material to become adherently bonded to the substrate by means of the aluminum bonding layer.

* * * * *

UNITED STATES PATENT OFFICE
CERTIFICATE OF CORRECTION

Patent No. 3,812,563         Dated May 28, 1974

Inventor(s) Milton W. Toaz

It is certified that error appears in the above-identified patent and that said Letters Patent are hereby corrected as shown below:

Column 2, line 14, "in" should read --is--;

line 46, "0.020" should read --0.20--.

Column 4, line 1, "0.010" should read --0.10--.

Signed and sealed this 22nd day of April 1975.

(SEAL)
Attest:

RUTH C. MASON
Attesting Officer

C. MARSHALL DANN
Commissioner of Patents
and Trademarks